(12) United States Patent
Yalniz et al.

(10) Patent No.: US 9,691,161 B1
(45) Date of Patent: Jun. 27, 2017

(54) MATERIAL RECOGNITION FOR OBJECT IDENTIFICATION

(71) Applicant: A9.com, Inc., Palo Alto, CA (US)

(72) Inventors: Ismet Zeki Yalniz, Mountain View, CA (US); Leo Benedict Baldwin, San Jose, CA (US); Arnab Sanat Kumar Dhua, Mountain View, CA (US); Isabella Talley Lewis, San Jose, CA (US); Colin Jon Taylor, Orinda, CA (US)

(73) Assignee: A9.com, Inc., Palo Alto, CA (US)

( * ) Notice: Subject to any disclaimer, the term of this patent is extended or adjusted under 35 U.S.C. 154(b) by 49 days.

(21) Appl. No.: 14/866,677

(22) Filed: Sep. 25, 2015

(51) Int. Cl.
*G06K 9/00* (2006.01)
*G06T 7/40* (2017.01)
*G06K 9/62* (2006.01)

(52) U.S. Cl.
CPC ........... *G06T 7/407* (2013.01); *G06K 9/6201* (2013.01); *G06T 7/408* (2013.01); *G06T 2207/10024* (2013.01); *G06T 2207/30124* (2013.01)

(58) Field of Classification Search
CPC ..................... G06T 7/407; G06T 7/108; G06T 2207/10024; G06T 2007/30124; G06K 9/6201
USPC .................................................. 382/111, 181
See application file for complete search history.

(56) References Cited

U.S. PATENT DOCUMENTS

| | | | |
|---|---|---|---|
| 6,310,627 B1* | 10/2001 | Sakaguchi | A41H 3/007 345/630 |
| 8,396,486 B2* | 3/2013 | Lee | H04W 48/16 455/456.1 |
| 8,525,828 B1* | 9/2013 | Bates | G06T 17/00 345/419 |
| 2009/0116698 A1* | 5/2009 | Zhang | G06K 9/00362 382/111 |
| 2011/0142335 A1* | 6/2011 | Ghanem | G06F 17/3025 382/165 |
| 2011/0274314 A1* | 11/2011 | Yang | G06K 9/00369 382/103 |
| 2013/0117909 A1* | 5/2013 | Paas | G09F 21/02 2/244 |
| 2013/0215116 A1* | 8/2013 | Siddique | G06Q 30/0643 345/420 |
| 2014/0379426 A1* | 12/2014 | Guo | G06T 11/60 705/7.31 |
| 2015/0023552 A1* | 1/2015 | Rosen | G06K 9/00362 382/103 |
| 2016/0358374 A1* | 12/2016 | Ju | G06T 17/20 |

* cited by examiner

*Primary Examiner* — Tom Y Lu
(74) *Attorney, Agent, or Firm* — Hogan Lovells US LLP

(57) ABSTRACT

The recognition of objects such as clothing items can be improved by capturing image data that represents the material characteristics and true color of the object. A high resolution image can be captured that shows the individual threads and/or fibers, among other possible pattern or texture characteristics. Various approaches are discussed for determining the scale of these features to more accurately determine the way the material is made. Further, approaches are discussed that enable the true color of the material to be determined, through hardware and/or software, to further improve the accuracy of such a determination. The material and color properties can be combined with a conventional object recognition process to provide accurate object identification and/or authentication results.

20 Claims, 14 Drawing Sheets

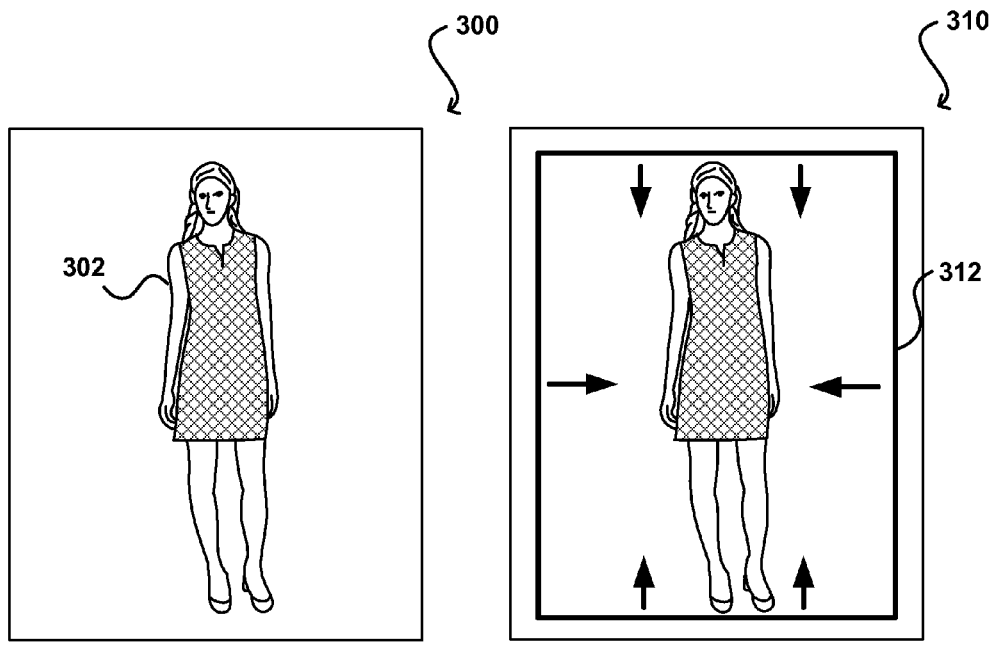
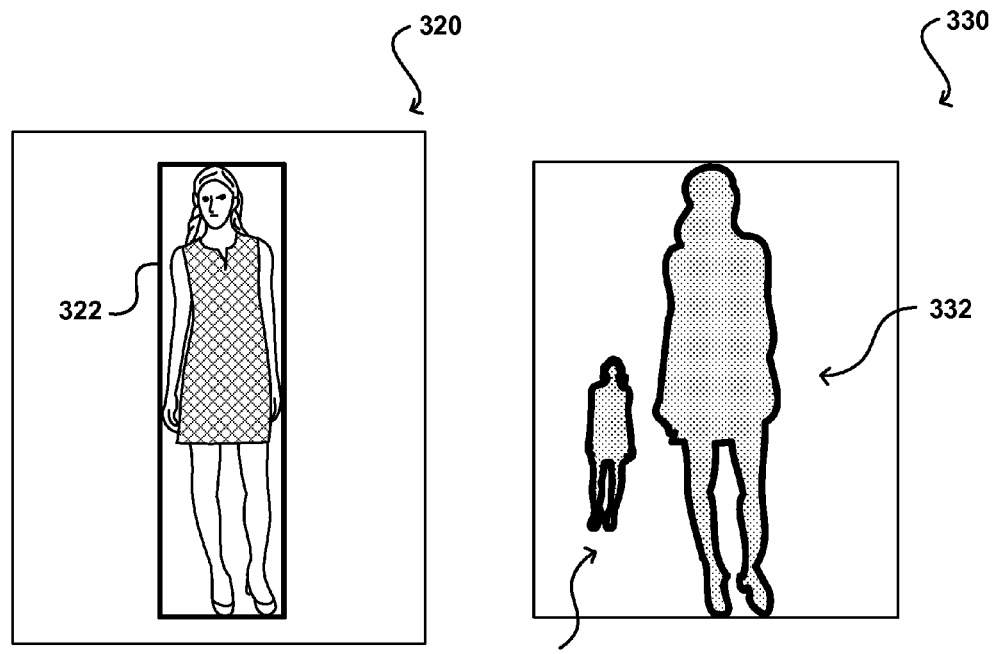

MATERIAL RECOGNITION FOR OBJECT IDENTIFICATION

BACKGROUND

Users are increasingly utilizing electronic devices to research, locate, and obtain various types of information. For example, users may utilize a search engine to locate information about various items, such as items offered through an electronic marketplace. Conventional approaches to locating content involve utilizing a query to obtain results matching one or more terms of the query, navigating by page or category, or other such approaches that rely primarily on a word or category used to describe an item. Such approaches can make it difficult to locate items based on appearance or aesthetic criteria, such as a specific pattern or texture of material. Thus, users can have difficulty locating the appropriate items, or may at least have to navigate through many irrelevant results before locating an item of interest. Approaches exist for matching images to determine a type of item. Although the style and the shape of the item might be correctly identified, the actual item might still be different because of its brand, the techniques and materials used for weaving or creating the material, or the color misinterpretation due to the illumination changes.

BRIEF DESCRIPTION OF THE DRAWINGS

Various embodiments in accordance with the present disclosure will be described with reference to the drawings, in which:

FIGS. 3A, 3B, 3C, and 3D illustrate example approaches for removing background from an image that can be utilized in accordance with various embodiments.

DETAILED DESCRIPTION

Systems and methods in accordance with various embodiments of the present disclosure may overcome one or more of the aforementioned and other deficiencies experienced in conventional approaches to locating, identifying, and/or providing digital content in an electronic environment. In particular, various embodiments provide for the detailed imaging of material of an object, as may be useful in more accurately identifying the object. In some embodiments, a high resolution camera can be used that is able to produce an image from which individual threads and/or fibers of a pattern can be recognized. Various approaches are used to determine the scale and/or true color of the material in order to further improve the accuracy. These approaches can include, for example, using a measurement standard or multiple light sources to be able to account for any deviation from true color due to hardware limitations or properties, as well as automatic software adjustments or other such occurrences. The material analysis can be combined with a general object recognition process in order to provide more accurate results, as well as to be able to detect counterfeit goods or variations in quality, among other such aspects.

Various other functions and advantages are described and suggested below as may be provided in accordance with the various embodiments.

Figure 1A:
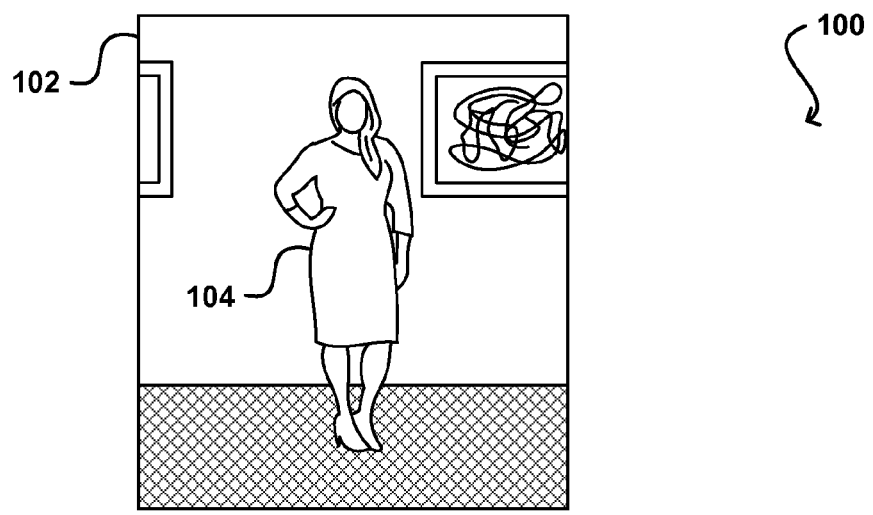
FIGS. 1A and 1B illustrate examples of an approach that can perform image match based on image swatches that can be utilized in accordance with various embodiments.
Figure 1B:
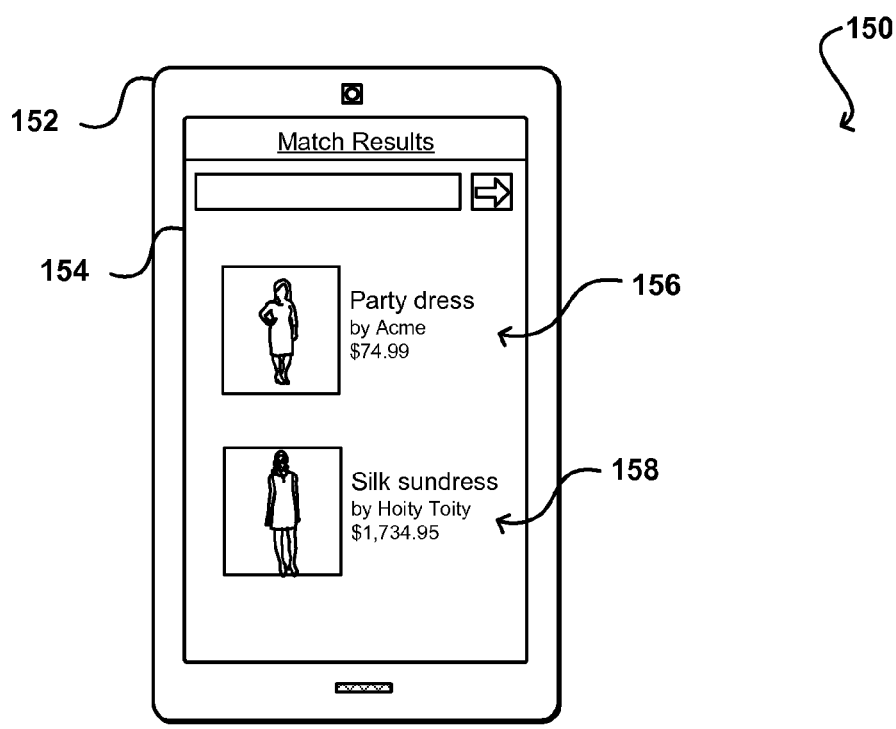
Figure 2A:
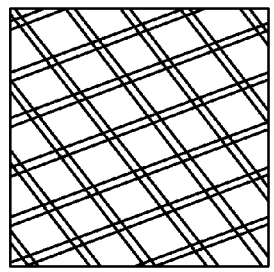
FIGS. 2A, 2B, 2C, and 2D illustrate various images that can be captured representing different materials that can be utilized in accordance with various embodiments.
Figure 2B:
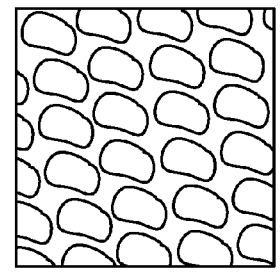
Figure 2C:
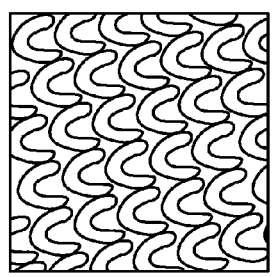
Figure 2D:
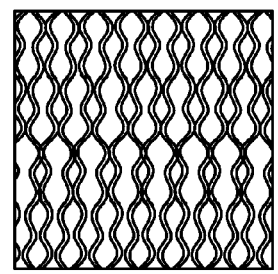

FIG. 1A illustrates an example situation 100 that can be utilized to attempt to identify and object of interest and/or locate matching images in accordance with various embodiments. In this example, an image 102 is obtained that includes a representation 104 of a woman wearing a dress. It can be the case that a user likes the dress and wants to locate information about that dress or find out if the user can purchase that dress. For example, a user might see a person wearing the dress or see the dress on a mannequin or in a window and want to be able to obtain information about the dress. The user can use a camera of a computing device, for example, to capture an image of the dress that can be uploaded or otherwise transmitted to a system or service for analysis. In this example, the image can be uploaded to an electronic marketplace or online retailer system, for example, that includes hardware and/or software for analyzing the image and attempting to recognize the object(s) represented in the image. In conventional systems, the image will be analyzed to recognize features in the image that can then be compared against features for other images from an electronic catalog or other digital image repository. A problem with such an approach, however, is that the accuracy is limited. For example, the image match process might be able to identify that the object in the image is a white dress of a certain style. There might be multiple such white dresses in the electronic catalog, however, such that information for multiple matches 156, 158 might be presented in a search interface 154, or other such interface, displayed on a computing device 152 as illustrated in the example situation 150 of FIG. 1B. The user then may not be able to tell which of the dresses corresponds to the dress of interest. It is possible that the dress results presented might be of substantially different material, such that with more information the actual dress could have been identified. For example, one dress 156 might be cotton while the other 158 is silk, which could result in substantially different items both being identified for the captured image. Even differences such as wool versus cashmere can be important to a user, and can be detectable with the proper image data. It is also possible that the dress is cotton but the results displayed are cotton dresses of slightly different color. While the true color may be different, the color represented in the images may be similar. This can be a factor of the lighting of the images, the range of the color sensor, adjustments made during an image capture process, etc.

In order to more accurately identify an object such as an item of apparel, it can be beneficial to capture additional information that gives some insight into the true color and/or material of the item. For example, consider the example images 200, 220, 240, 260 of FIGS. 2A-2D. These images are captured with relatively high resolution and/or near enough to the fabric that the individual threads and/or knots can be seen, and in some embodiments even the fibers of the threads. As illustrated, the various materials have very different thread properties, including thread width, thread density, looping, arrangement, stitch patterns, and other such aspects. The knots or textons created using the thread can also have specific width, loop, arrangement, and other such properties that are representative of the material as well. By analyzing the object at the thread, knot, or fiber level, for example, the type of material of the object can be determined, which can help to better identify the object. Further, certain designers or manufacturers may have specific textures or thread patterns that are indicative of those sources. This can help to not only identify an object, but also to identify counterfeit goods. Once the material type is recognized, that type can also be used as a search term or query to locate other items of that material or with those material properties. In some embodiments this can include determining a word description of the material, such as brushed aluminum or 600 thread cotton weave, and submitting those terms as search queries or using those terms as sorting criteria, among other such options.

As mentioned, in some embodiments it will be desirable to identify an object using at least a first image showing a sufficient portion of the object, if not an entire view of the object, in order to be able to determine a type of object as well as to identify recognizable features of that object. This can be used with a closer and/or higher resolution image of a portion of the object that can enable analysis of the material and/or individual threads. In order to determine the items in a particular image, it can be desirable in at least some embodiments to identify the portions of the image that correspond to a single person, as well as those that correspond to various items. This can involve any of a number of segmentation processes, which can be performed manually or automatically in various embodiments. In a manual process, a person can cut, crop, or otherwise specify portions of an image that correspond to different items, such as apparel items, jewelry, and the like. The person can then manually attempt to identify the items, or can cause the designated portions to be analyzed by an object recognition algorithm, for example, where the person may first specify a category or type of item to minimize the search space, or the object recognition algorithm can do a full search against an entire search space, such as an electronic catalog.

In other embodiments, an automatic segmentation process can be used to analyze the various images and attempt to segment the image into portions corresponding to a single person or entity, individual objects or items in the image, or other such segments. One example approach to segmenting an image is illustrated in FIGS. 3A-3D. A first step of such an approach can involve removing background portions of the image or otherwise removing from consideration any portions of the image that do not correspond to an item of interest, in order to improve the accuracy of the results and lessen the amount of data to be analyzed. In the situation 300 of FIG. 3A, an image is obtained that includes an item 302 that is contained in an electronic catalog, in this case the item being a dress being worn by a person. It should be understood that in some images a person might not be present, or only a portion of a person might be represented, among other such options. In the example situation 310 of FIG. 3B, a cropping process begins by starting at the corners and/or edges of the image and moving each side of a rectangle 312 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes. In cases where the background portion cannot readily be determined due to the presence of other such objects or background patterns, etc., an object recognition process may have to utilize the entire image, or a majority of the image, as discussed elsewhere herein.

After each edge has stopped at an edge or contour of an object, a rectangularly-bound region 322 of the image will be determined that will include the item of interest, as illustrated in the example situation of FIG. 3C. For images that contain models wearing various items, this can help reduce the search space to the items worn by a single person. The image in some embodiments can then be cropped to this region, such that the background pixels previously located outside this region in the image are removed from the image file.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In FIG. 3D, an outline or mask region 332 can be determined that then corresponds to the foreground (or background) portion of the image. This can be used to crop the image based on the location of the object, or can be used to expand the object to the appropriate aspect ratio, as discussed elsewhere herein.

If the image includes multiple objects, such as a second person as illustrated in the example of FIG. 3D, the connected components analysis can still connect the background regions, which can result in determining a second object region 334 in the image. Various approaches can then either consider these objects together or as separate objects for purposes of cropping or image match. For images with multiple such object regions, one or more rules or policies could be utilized that indicate to select only the top region, most central region, largest region, etc.

Figure 4A:
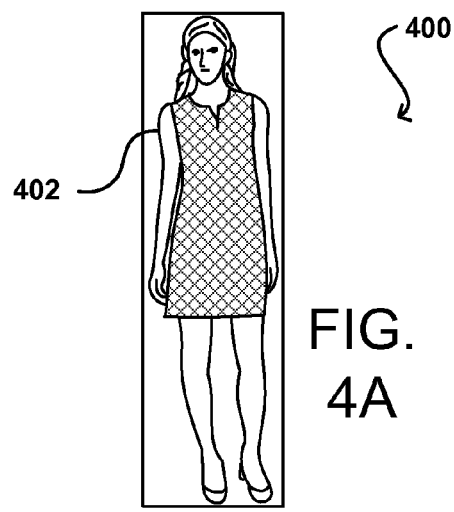
FIGS. 4A, 4B, and 4C illustrate an example approach to locating specific items represented in an image that can be utilized in accordance with various embodiments.
Figure 4B:
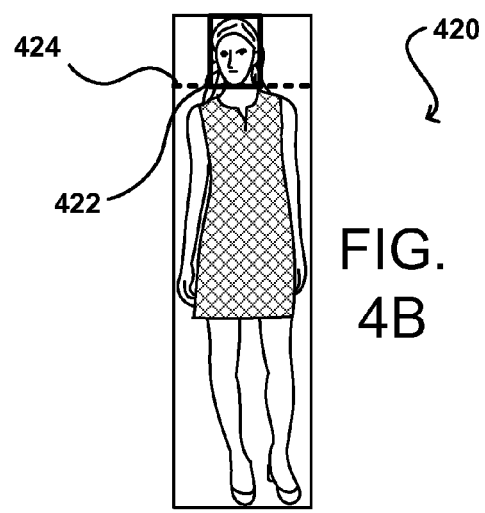

In at least some embodiments, a next portion of the process involves cropping the image based at least in part upon a location of a face of the wearer in the image. As illustrated in the example situation 400 of FIG. 4A, the input can be the cropped image from FIG. 3D that has minimal background, although other versions of the image can be utilized as well within the scope of the various embodiments. From such an image, a face or head recognition process (i.e., a process using a Viola-Jones or deformable parts model (DPM)-based face recognition algorithm) can be used to attempt to locate a face or head in the image, at least in the upper portion (e.g., top half or quarter) of the image. As illustrated in the example situation 420 of FIG. 4B, a location or bounded region 422 identifying the location of such a face can be determined using an appropriate location algorithm as discussed elsewhere herein. From this region, an appropriate location for cropping can be determined. The appropriate location can depend at least in part upon the type of items to be recognized. For example, if the items include earrings and glasses then the location might be the top third of the person's head. If the items are only clothing, then the appropriate crop location might be at the bottom of the person's face, or just above the bottom in order to account for collars or other such features. If hats are to be considered then no cropping may be performed, but the location of the face may be used to segment out a potential hat portion of the image from the other portion of the image.

Figure 4C:
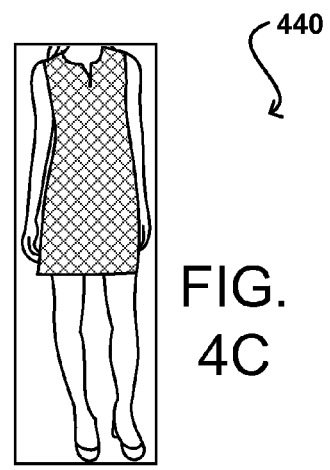

In this example, the location is the bottom of the head or face region in the up/down direction (in the figure). Such a point can be used to determine the new edge location 424 of the image, which passes through that point and parallel to the upper edge of the image (in the figure). It should be understood that terms such as "up" and "down" are used for purposes of explanation and that other arrangements or directions can be used as well within the scope of the various embodiments as appropriate. Using this edge location, the image can be cropped (or image data ignored) to remove the portion above that location, as illustrated in the example situation 440 of FIG. 4C. It should be understood, however, that processes other than traditional "cropping" can be used as well within the scope of the various embodiments. For example, pixels in the "cropped" or "cropped out" regions might have their values stored as metadata in the image, or set to an invisible or transparent setting, among other such options, such that the object appears to be cropped but the information is still in the image such that the original image can be recreated from the manipulated or "cropped" image if desired.

Figure 5A:
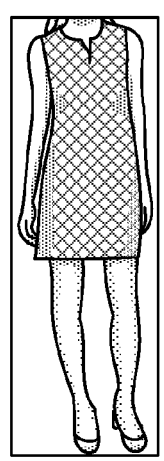
FIGS. 5A, 5B, and 5C illustrate an example approach to locating specific items represented in an image that can be utilized in accordance with various embodiments.
Figure 5B:
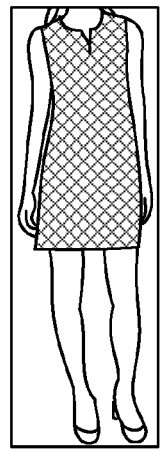
Figure 5C:

In this example, the cropped image can be used as input to the next portion of the process. In the example situation 500 of FIG. 5A, it can be seen that the cropped image is provided that will likely be a full color (e.g., 24 bit) image, or other such image with a conventional color depth. In order to locate the leg regions without utilizing a complex image recognition process, approaches in accordance with various embodiments can attempt to locate regions of skin color or skin tone that are positioned in a way that would be expected for legs in the image. The skin colors can have ranges of values that can depend at least in part upon the color space, color depth, etc. In order to improve accuracy, in at least some embodiments a version of the cropped image is produced, as illustrated in the example situation 510 of FIG. 5B, which is quantized, or has a reduced color depth. Reducing the color depth to, say, 256 bit color, can cause the skin regions to have less color variation and thus be more likely detected as contiguous regions of skin color. From the quantized image, the color of each pixel in the image can be analyzed to determine whether each pixel is, or is not, colored with a color that is within the range of skin tones. For pixels in that range, those pixels can be assigned a first value, such as 0. For pixels with colors outside the skin color range, those pixels can be assigned a second value, such as 1. The result will then be a mask image, such as is illustrated in the example situation 520 of FIG. 5C, wherein the regions of skin are identified with respect to the non-skin regions. For example, the leg and arm regions of the image are readily identifiable from the skin mask image. In embodiments where the background was not previously able to be removed, the portions(s) of the image to be analyzed can be selected based at least in part upon the location of the skin regions. For example, the area between skin regions might be selected for analysis, or areas relative to the skin regions for certain types of items, among other such options.

Figure 6A:
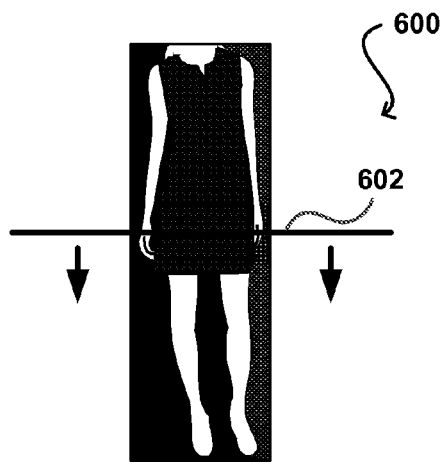
FIGS. 6A, 6B, 6C, 6D, 6E, and 6F illustrate an example approach to locating specific items represented in an image that can be utilized in accordance with various embodiments.

Once a skin mask (or similar binary version) is created, that image can be analyzed to attempt to determine the presence of legs in the image, as well of the positions of any such legs. For example, in the situation 600 of FIG. 6A a scan (represented by the scan line 602) can start at, or slightly above, the half-way point of the image from top to bottom. This is a reasonable place to start as legs will typically be located in the bottom half of the image, and starting here helps to reduce false positives that might otherwise be detected in the top half of the image. From this point, the scan line can move line by line (or every other line, etc.) towards the bottom of the image and attempt to locate scan lines where transitions between skin and non-skin regions indicate the potential presence of legs. For example, in the situation 610 of FIG. 6B two scan line regions are illustrated where there are regions of skin and non-skin on the scan line. Any scan line that includes one or two areas of skin may be designated as a potential leg position, as the legs could be apart or could be together, where they might appear as a single skin region. A first pair of skin regions is designated by two segments 612, 614 that appear on the same scan line and are separated by a non-skin region. Similarly, a second pair of skin regions is also designated by two segments 616, 618 that appear on the same scan line and are separated by a non-skin region. Based on the scanning of the mask alone, it would be difficult to say with certainty which of these scan line segments correspond to legs and which correspond to arms.

Figure 6B:
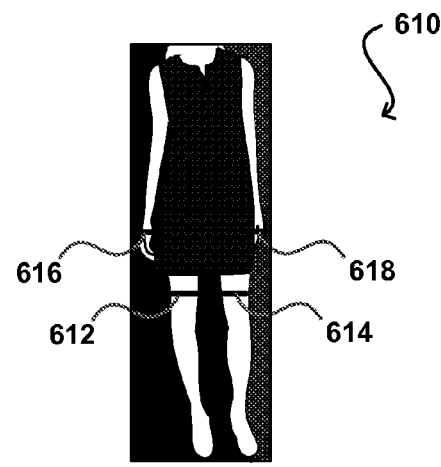
Figure 6C:
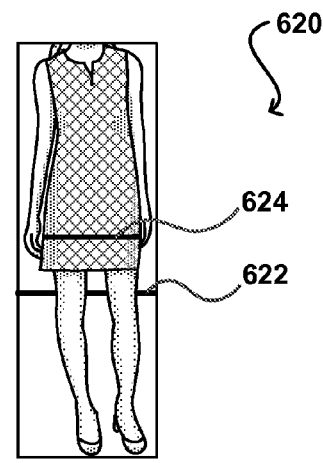
Figure 6D:
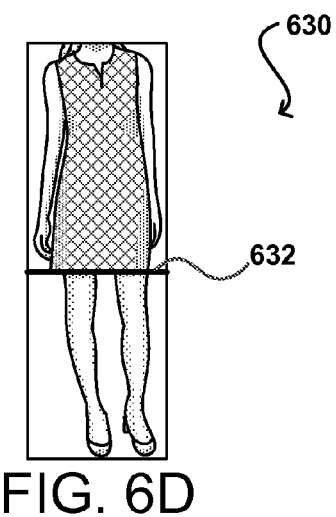

Accordingly, the process also utilizes a version of the image as illustrated in the situation 620 of FIG. 6C, which can be a full color, reduced color, or grayscale image, among other such options. In this example, the image is a grayscale image and areas of background can be distinguished from areas of non-background color. In this case, a set of scan line segments 622 corresponding to the first pair of segments 612, 614 in FIG. 6B shows that only background is located between the skin regions. Such a determination can be made by computing some edge features from a scan line or row of pixels, then processing these features using a classifier algorithm (e.g., hand-trained classifier, trained decision tree, etc.) to determine whether the row contains a dress and hands, a part of clothing, a pair of legs, etc. Based on at least this information, it can be determined from the example that the segments likely correspond to legs. A second scan line segment 624 corresponding to the second pair of scan line segments 616, 618 indicates that, based on the color value of the pixels along the scan line between the skin region, the area between the skin regions is not background, which indicates that these regions are likely not leg regions, as a dress that stops at the knees, for example, would not have anything (typically) between the legs of the wearer below the knee. Further, the skin regions may be determined to be too thin, too far apart, or otherwise have aspects or dimensions that are indicative of not corresponding to legs in the image. By performing such a process down some, most, or all of the lower half of the image, for example, it can be determined that the visible portion of the legs starts at a particular scan line 632 as illustrated in the situation 630 of FIG. 6D. This may not be a precise determination due to the shape and deformability of the dress or skirt, but such precision may not be necessary for at least some embodiments. Once located, the image can be cropped to yield an image as illustrated in the situation 640 of FIG. 6E. If a connected components-based approach was used as discussed elsewhere herein, the determination of background pixels between the leg regions can improve the confidence of the determination.

Figure 6E:
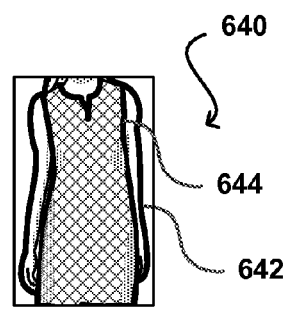
Figure 6F:
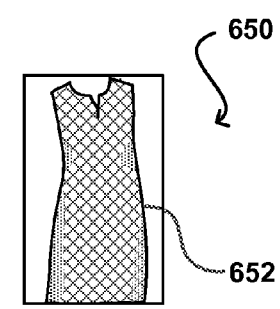

The image in the situation 640 of FIG. 6E is cropped top to bottom to approximately the location of an item of interest. From earlier steps, the contour 642 from the connected components analysis and a contour 644 from the skin tone region analysis can be used to further remove portions of the image from consideration. For example, any remaining points in the image outside the connected components contour 642 can be excluded from further analysis. Similarly, any points that were determined to correspond to regions of skin tone, inside a skin region contour 644, for example, can also be excluded, although as mentioned in some embodiments such an approach may not be used for image regions with a very high percentage of skin tone pixel values, or low deviation from skin tone, as that might correspond to a dress or other item having a color within the skin spectrum. If the skin tone and connected components contour are used to exclude points from consideration, the remaining image illustrated in the situation 650 of FIG. 6F will include pixel values almost exclusively that correspond to a region 652 of the item of interest. This can help to automatically generate an image of the item to be used with suggestions, for example, but also can enable the correct portion of the input image to be used for object identification or image matching, and will likely result in far more accurate results that matching against the entire image. While such an approach may not be as accurate as running the image through a very complex image analysis routine, the process will be much faster and require far fewer resources. If the image of FIG. 6F is run through an image match process and several possibilities show up with all with relatively low confidence scores, the image can be further analyzed to attempt to determine whether the region includes multiple items, such as a top and a skirt instead of a dress, such that the image portions for those items can be searched separately. This can be done, for example, by looking for different colors or patterns, doing an edge analysis, performing another connected components analysis, or performing another image segmentation process as discussed or suggested herein.

In addition to the "macroscopic" view of the dress, which enables identification of the type of object using computer vision, image matching, or other such processes discussed and suggested herein, approaches in accordance with various embodiments can attempt to analyze a second image including a "microscopic" view of a portion of the dress, or other such item of interest, with sufficient resolution and/or detail to enable the thread and/or material to be identified. Further, in at least some embodiments the microscopic view can be analyzed to attempt to determine the "true color" of the item, as may include a single color, set of colors, or average color, among other such options. One of the major challenges is the color estimation. In different environments, the color measured by the camera might be significantly different depending on the position, orientation, proximity and color temperature of the light sources and the nearly objects. The true color of the object can therefore not be estimated precisely using conventional imaging technologies including digital cameras. Obtaining true color data using approaches discussed and suggested herein can help to provide more accurate results than when image matching based on images captured under different imaging conditions.

Figure 7A:
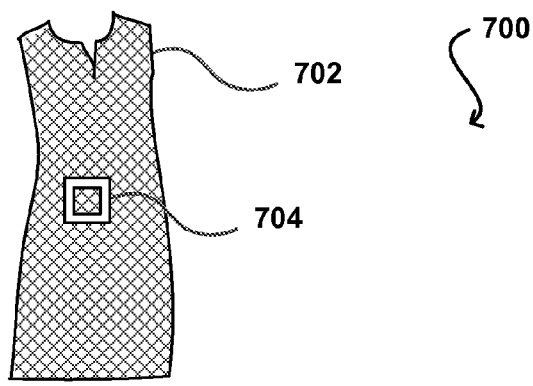
FIGS. 7A, 7B, and 7C illustrate an example process for using a reference object with image capture that can be utilized in accordance with various embodiments.

FIG. 7A illustrates an example approach 700 that can be used to obtain such an image in accordance with various embodiments. In this example, a user can use a camera (or other such image sensor-containing device) to capture an image of a portion of an object, such as a dress 702, where that image will contain a representation of a portion of the dress that is representative of a primary material of the dress. It should be understood that in other embodiments multiple such images may be captured of the same or other material regions showing primary, secondary, or other patterns or materials, among other such options. As mentioned, image of such a region can be captured sufficiently close to the object, and with sufficient resolution, such that information about the material of the object can be discerned. This can include, for example, being able to recognize aspects such as the type of thread or material weave as discussed and suggested elsewhere herein.

Figure 7B:
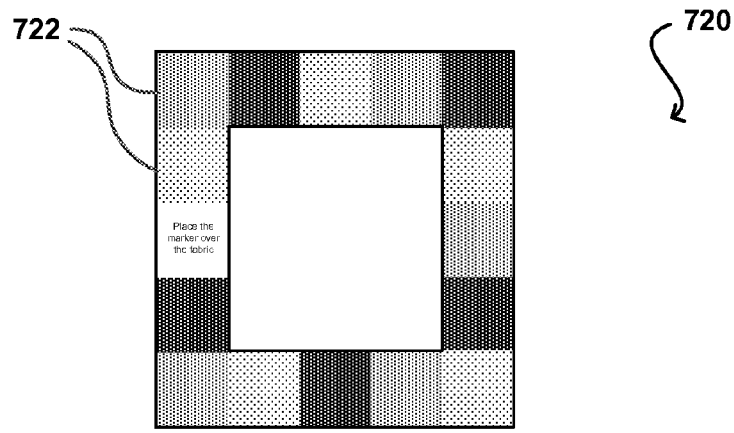

While information such as the pattern of the weave, alignment of the threads, or color of the individual threads can provide information that enables a more accurate match than the macroscopic view itself, the image in many instances will not be able to provide other useful information such as the scale of the pattern, thickness of the threads, or true color of the material. Accordingly, approaches in accordance with various embodiments can include a measurement standard 704, or other such element, that can be included with the portion of the object to be captured in the image. An example of such an element 750 is illustrated in the FIG. 7B. This example element 720 is a square piece having an opening therein. The element 720 has a plurality of different color regions 722, with the regions representing different "true" colors. In this example, the element includes regions of three different colors: red, blue, and green. These can be tristimulus colors, for example, as are used in environments such as printing presses and paint matching machines to determine the "true color" of an object. There are many reasons why an image will not represent the true color of an object. For example, lighting intensity and color will change for different times and locations. Different camera sensors will have different sensitivities, dynamic ranges, and other such characteristics that can affect how the light captured for a given color is represented. Further, many cameras utilize image "correction" algorithms that attempt to improve the overall appearance of the image by adjusting factors such as the brightness, gamma values, contrast, and other such factors, which may make the image more visually pleasing to a viewer but often causes the image to stray from representing the actual color of the objects represented therein.

By using an element 720 as a color standard, any changes of the color regions of the standard represented in the color image can be detected, since the true color of these regions is already known. The colors of the image can then be adjusted, or the changes from true color at least accounted for, in order to cause the true colors of the items represented in the image to be determined. This can include, for example, adjusting the brightness, contrast, color balance, white value, and other such settings based on deviations of the color regions represented in the image from their known color. Using such an approach, the true color of the material and threads can be determined, which can improve the accuracy of an image match. In at least some embodiments a provider of content for an electronic catalog, or other such entity, can use a similar approach to analyze the images placed in the catalog. This information can be used to adjust the images themselves so that they represent the true colors, or can be stored as metadata for the image such that a match process can use the color information along with the image match. In some embodiments a color histogram, color gradient, or color feature vector can be created and stored with each image in order to allow for a quick and accurate matching process.

Figure 7C:
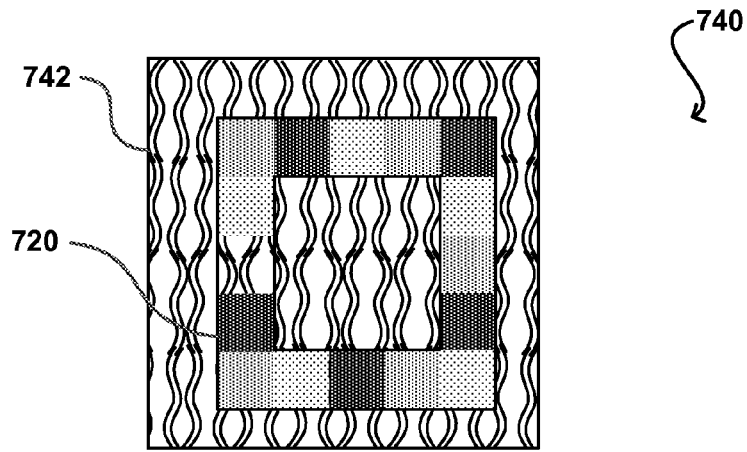

In addition to color, the sizes of the color regions can also be used to provide a known scale to the image. It should be understood that other scale indicators may be used as well, such as regular gradations, rulers, etc. In this example each color region has at least one known dimension, such as height or width. In some embodiments the dimension along the window is at least a known value. In this example each color region is a square of equal size, but other sizes and combinations can be used as well. By including a scale with the element 720, the captured image 740 illustrated in FIG. 7C includes a representation of both a region of the material 742 and a representation of the element 720, enabling the scale of the threads and pattern to be determined as well as the true color. This can help to more accurately determine the type of material used, and match that material to material types, styles, and colors known for specific objects, designers, manufacturers, etc. As with the true color, the images stored in an electronic catalog can be manipulated to have a consistent scale, or can include metadata that provides the scale of the image such that aspects such as the width of a thread or the size of a loop can be determined. Feature vectors including accurate dimension data can also be generated for the microscopic view images to improve the speed and accuracy of the match process in at least some embodiments.

The measurement or reference element 720 itself can be made out of any appropriate material, such as plastic, cardboard, or aluminum. The material selected should be able to hold and retain regions of true color. The elements can be purchased by users, provided with purchased objects, or placed on packaging as part of a label or packing slip, among other such options. As mentioned, users can use such elements to capture the true color of objects in images, while content providers, manufacturers, and other such entities can utilize similar elements to determine the true color of objects against which matching is to be performed, algorithms are to be trained, etc.

In some situations it may not be desirable to require a user to carry and utilize such a standard or element. Accordingly, approaches in accordance with various embodiments can utilize elements in the capture process that help to provide more accurate scale information and true color data. These elements can be built into a camera in some embodiments, or provided as an accessory that can work with an existing camera, among other such options.

Figures 8A, 8B:
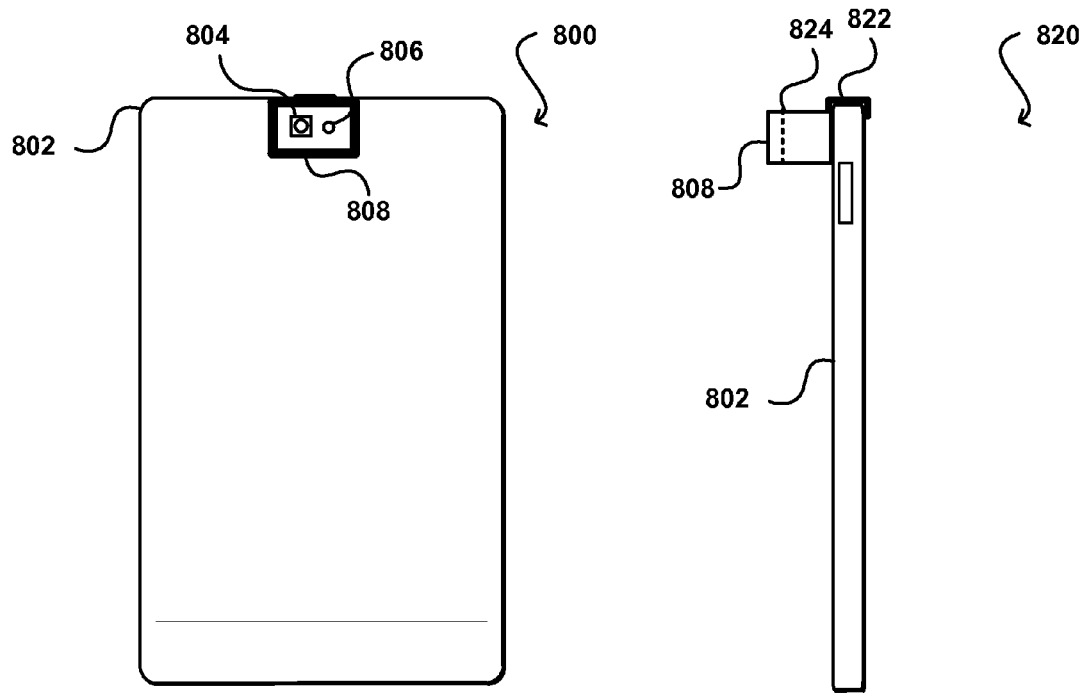
FIGS. 8A, 8B, 8C, and 8D views illustrated views of example image capture accessories that can be utilized in accordance with various embodiments.

As an example, the configurations 800, 820 of FIGS. 8A and 8B illustrate an example accessory that can be utilized with a camera of a computing device 802 in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), DSLR cameras, television set top boxes, and portable media players, among others.

In this example, the accessory includes a body portion 808 having determined dimensions (such as may create a distance between the camera and an object of between 0.25" and 1.0") and a clip portion 822 that enables the accessory to be removably attached to the computing device. This example accessory is sized to enable a camera 804 and light emitting diode (LED) 806, or other such light source, to be included in an interior opening of the body portion. The body portion is square in cross-section with openings on both ends, such that when the outer opening of the accessory is placed against an object, substantially all light from external to the device, accessory, and object will be blocked by the walls of the accessory. The overall shape of the body portion can be that of a cube, rectangle, or pyramid, among other such options. In this way, substantially the only light that will be able to be reflected by the object and detected by the camera will be the light emitted from the LED 806 of the device. In at least some embodiments the interior of the walls of the accessory can be painted, coated, or made of an anti-reflective material, such that the light reflected back to the camera sensor will be primarily from the object of interest. On the edge of the accessory that attaches to the computing device, a rubber O-ring or other such deformable seal or element can be used to help prevent stray light from creeping into the interior of the accessory during image capture.

The ability to block out external light and utilize only light of a known wavelength, wavelengths, or wavelength band provides some control over the modification of the colors detected by the camera, as no light of unknown wavelength can be reflected and captured that can affect the apparent color of the object. In some embodiments, the accessory can also include one or more optical elements 848 for adjusting the light from the illumination source. This can include, for example, one or more diffusing optics, attenuating optics, prisms, or other such elements that can cause the light to be incident upon the object in a more uniform or determined fashion, instead of from a point source at a specific location, and/or can cause the light to be incident from different or specific directions, among other such options. Since some materials appear different based upon the direction of the reflected light, it can be desirable in at least some embodiments to get light data for one or more specific or different directions. In some embodiments, the color standard 824 can be built into the accessory, such that it is included by default in any image captured using the accessory. This may not be optimal in all situations, however, as it is possible that light reflecting from the color regions would be reflected off the material and back to the camera, or from the material off the color region to the camera, which could affect the detected color of the object, particularly for near white objects.

Figures 8C, 8D:
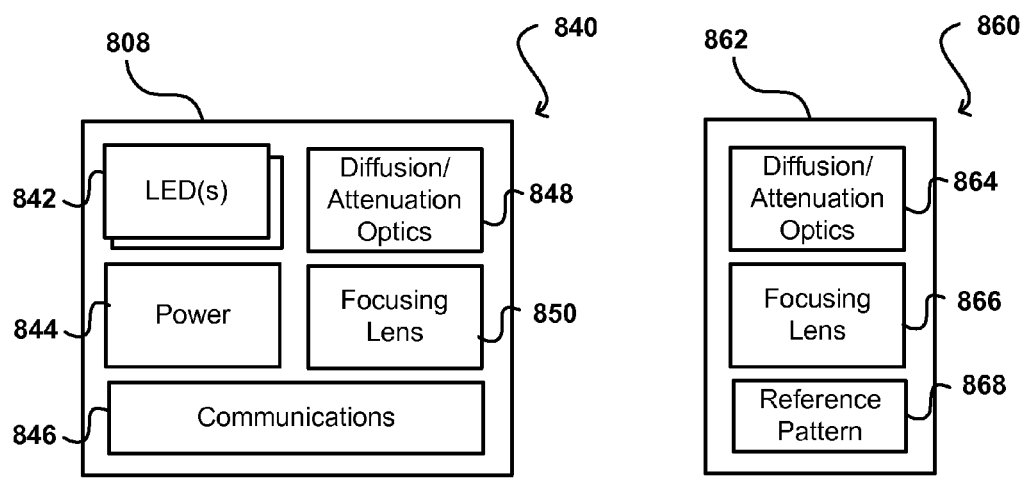

The body 808 portion can also advantageously be of a known size. For example, the body can be configured such that when the accessory is connected to the device and pressed against an object of interest, the camera will be a known distance from the object. By knowing the characteristics of the camera and the optics, this provides a relatively accurate sense of scale. A thread at a known distance will appear a certain size in the image based upon its actual size, such that the scale can be determined for a camera system with known attributes. In some embodiments the accessory can also include additional optics, such as a focusing lens 850 as illustrated in FIG. 8C, that increases (or otherwise adjusts) the effective focal length of the camera and enables the camera to better focus on an object at a distance equivalent to the thickness of the accessory body 808, or that are otherwise very close to the camera at a time of image capture. Such an element can help to provide more accurate and fine detail for matching and measurement purposes, among other such options. The focusing optic can be selected such that for the thickness of the accessory the auto-focus of the camera is able to focus on the material positioned at an outer edge of the accessory. FIG. 8D illustrates an example of the simpler device 860 discussed previously that may not include any communication or illumination elements, for example, but may only include the body 862 of the accessory having the determined shape and size, as well as the diffusion/attenuation and focusing optics 864, 866 for adjusting the effective properties of the camera and/or flash of the connected computing device. The optical element may also include one or more band pass filters or other such elements for adjusting the light from the appropriate light source(s). In this example, the accessory also includes a reference pattern 868 as discussed previously, where the pattern may be placed at an appropriate location, such as near the opening of the accessory adjacent the material with an orientation that is parallel, perpendicular, or at an angle with respect to the item when placed adjacent the appropriate opening. Various additional or alternative elements can be utilized as well as discussed and suggested elsewhere herein.

An advantage to the accessory described thus far is that it is relatively simple and has few elements, such that it can be obtained relatively cheaply by a user and will work with many different types of devices. The accessory can have the body and clip sized and/or adjustable to work with various devices, or different versions of the accessory available, such that they can be easy for users to utilize across different devices over time. Further, the lack of active components means that the device will not drain power or resources on the device 802 to which it is attached. Further, such elements could be built into such a device in at least some embodiments, where the body could be fixed or extendable, among other such options.

It might be the case, however, that such an accessory may provide sufficient scale information but is unable to result in a true color image, or true color data, being obtained. For example, certain computing devices are known for automatically manipulating images in ways that are not exposed to a user, such that even for a known light source the resulting color in the image is not reliable. Accordingly, at least for more accurate color information from such a device it may be desirable to include additional elements in such an accessory.

For example, in some embodiments an accessory can include one or more LEDs 842 or other such light sources (i.e., narrow-spectrum semiconductor lasers) that can emit light at specific wavelengths, with specific polarizations, and/or in specific directions. The colors, polarizations, and/or directions can be selected to provide light with specific properties that can help to determine the true color of the material. In some embodiments, a series of images can be rapidly captured, such as a set of three to five images in less than a second, that can be aggregated, combined, or separately analyzed to determine the adjustments made by the software and/or hardware of the camera and/or device. In some embodiments, an image can also be captured using the white light LED 806 if the device itself. The LEDs, or multi-wavelength LED, of the accessory can project light of specific wavelengths, including ambient, IR, or UV wavelengths, in order to determine specific properties of the material, such as reflectivity, absorption, or fluorescence of the material in addition to the true color.

If the accessory includes such light sources, the accessory will need to be able to communicate with the device in order to coordinate the timing of the illumination with the timing of image capture. Accordingly, the accessory can include appropriate power 844 and communication components in at least some embodiments. In some embodiments the accessory can contain a battery (rechargeable or otherwise) and a wireless communication mechanism (such as Bluetooth®) in order to enable the accessory to be able to work with the device to receive lighting instructions, etc. In some embodiments, the accessory can include a USB 3.0 connector, or other such port or connector, that enables the accessory to make a wired connection to a device to obtain communications and/or power. Various other options, alternatives, and designs can be utilized as well within the scope of the various embodiments as would be apparent to one of ordinary skill in the art in light of the teachings and suggestions contained herein.

An advantage to analyzing apparel items is that the texture of apparel material in general is quite regular. Each node or texton (i.e., primitive pattern) is placed one after another with almost perfect accuracy. Several features might be extracted from these node patterns. The size of the nodes and the distance between them, as well as their primary directions of regularity (vertical, horizontal, diagonal, etc.) are among many features that can be used for pattern analysis. Accurate localization of structural textures along with the estimated granularity of textons and principal directions of regularity can be performed. These regularity features can then be used in at least some embodiments to segment and/or distinguish regular patterns. Convolutional Neural Networks (CNNs) can be used for a variety of image/pattern recognition tasks. Such a network can automatically learn a number of low level features, which can later be used for classification purposes using linear classification model such as a support vector machine (SVM). An image of the texture of cloth is generally quite regular such that low level textural features can be reliably extracted using CNNs.

Figure 9:
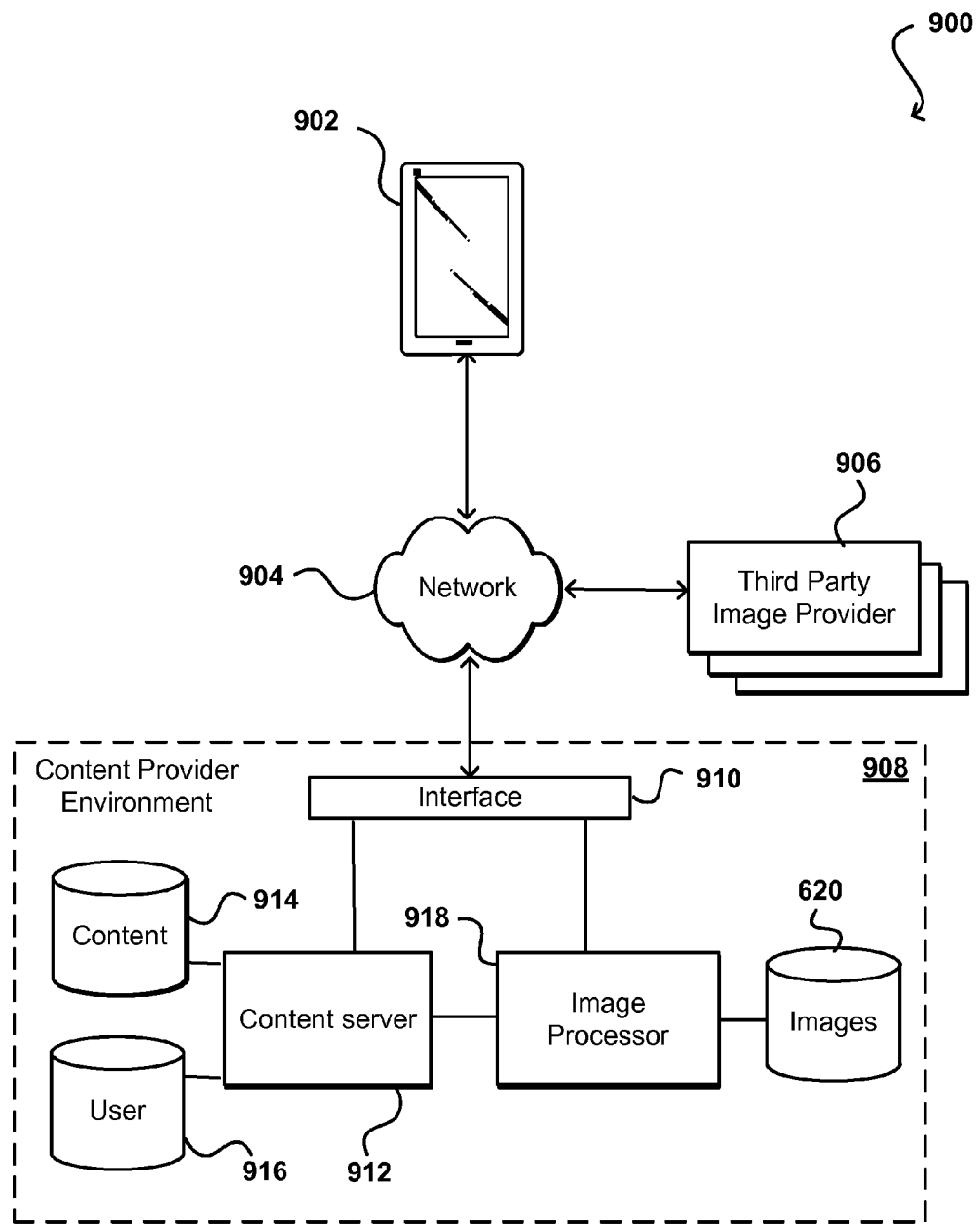
FIG. 9 illustrates an example system that can be used to analyze images in accordance with various embodiments.

FIG. 9 illustrates an example environment 900 that can be used to implement aspects in accordance with various embodiments. In FIG. 9, a client computing device 902 can submit a request for content across at least one network 904 to be received by a content provider environment 908. The network(s) can include any appropriate network, such as the Internet, a local area network (LAN), a cellular network, an Ethernet, or other such wired and/or wireless network. The content provider environment 908 can include any appropriate resources for providing content from a resource provider, as may include various servers, data stores, and other such components known or used for providing content from across a network (or from the "cloud").

In this example, a call received to the resource provider environment 908 can be received by an interface layer 910 of the environment. As known for network environments, the interface layer can include components such as interfaces (e.g., APIs), load balancers, request and/or data routers, and the like. If the request is a request for content, such as for content for a page to be displayed in an application (e.g., browser), information for the request can be directed to one or more content servers 912, which can obtain the content from a content data store 914 or other such repository to be sent back across the network(s) to the computing device. In some embodiments, information for the request might also be compared against user data in a user data store 916 or other such location do determine, for example, whether the user has access rights to that content. In one example, the content can include a plurality of images to be displayed as part of a set of search results, although various other types of content and uses for images can be utilized as well within the scope of the various embodiments.

In some cases, a request received to the content provider environment 908 might be from another entity, such as a third party image provider 906. As discussed previously, such providers may provide images to be displayed to users along with the served content. The interface layer can determine the type of request and cause information to be forwarded to an image processor 918 or other such component, which in some embodiments can cause the images to be stored to an image data store 920 at least temporarily. Since it may be desirable to manipulate at least some of the images before being presented for display, as discussed herein, the image processor can process at least some of the images before causing those images to be stored in the content repository 914, for example, to be presented for display to a user or otherwise utilized.

The image processing component, system, or service 918 can analyze images using approaches discussed herein, such as to determine object features as well as true color and material information. In some embodiments, spatial frequency techniques (i.e. Fourier transform-space analysis) can be used to determine weave using differential weave densities in the warp and weft directions. The images, or image data, can be matched against images received from third party suppliers, images stored in the content database 914, or query images received from a user, among other such options. As mentioned, material data can be determined from captured query images in order to perform more accurate image matching, and can also be determined for images to be used for the matching, in order to improve the match process by enabling colors, materials, patterns, and other information from the query images to be compared against similar information stored in the content database 914. The material images thus can also be stored in the content database 914, or another appropriate data store, at least for matching purposes. The content provider system 908 can also include at least one matching component, system, or service (not shown), which can receive information such as one or more query images from the image processor 918 and attempt to locate a match from image data stored in the content database 914, whereby the results of the match can be passed to the content server 912 for transmission to the requesting computing device 902.

Figure 10:
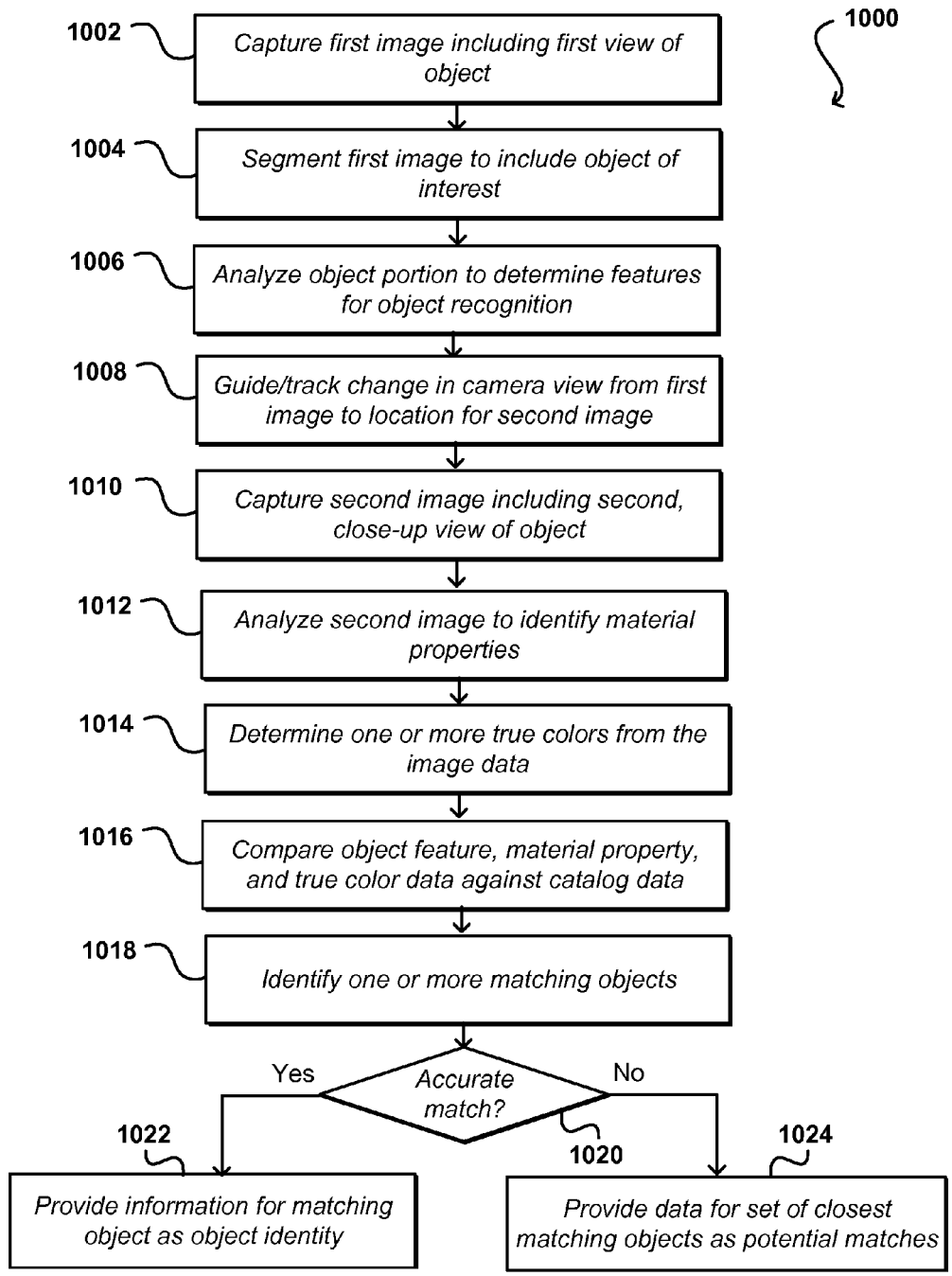
FIG. 10 illustrates an example process for using an image capture accessory with object recognition that can be utilized in accordance with various embodiments.

FIG. 10 illustrates an example process 1000 for identifying an object of interest that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a first image is captured 1002 that includes a first representation of an object of interest, where the first representation represents a full view of the object from at least one perspective in order to attempt to identify the type of object. The first image can be analyzed to segment 1004 the object of interest from the image. The object segment can be analyzed 1006 to identify feature points, or other such aspects, of the object that can be useful in an image matching, object recognition, or deep learning object classification process, among other such options. As mentioned, a second image can be captured that provides a close-up and/or high resolution view of a portion of the object that enables properties of the material to be determined. In this example, the movement or adjustments of the camera can be guided and/or tracked 1008 in order to help guide the user and/or device to capturing an appropriate second image at an appropriate location, as well as to enable scale data to be determined for both images where the movement includes a zoom, translation, or other motion or adjustment that can be tracked or monitored in a determined way that, when combined with knowledge about the camera or device, enables scale or dimension data to be determined. This can include analyzing data from a camera zoom element, device motion sensors (i.e., accelerometer, inertial sensor, gyroscope, compass, or magnetometer), and other such elements. It should be mentioned that the analysis of the first image can happen concurrently with, or after, the capturing of the second image in at least some embodiments. The tracking can be performed on video data, for example, where the first and second images correspond to determined or selected frames of the video data.

When the camera view corresponds to an area of interest for material analysis, as may result from a manual selection or pattern determination algorithm, among other such sources, a second image is captured 1010 that includes a high resolution view of at least one material region of the object. As mentioned, the second image can be captured using an accessory or dedicated components that provide at least a detailed view of the threads, weave, and/or other material aspects of the object. In some embodiments, the second image also represents, is associated with, or includes information about, the true color(s) of the material portion as well as scale or dimension information for the material. It should be understood that in at least some embodiments the second image could be captured before, or concurrently with, the first image.

The second image can be analyzed to identify 1012 thread patterns in the material. This can include, for example, stitch types, angles between dominant and other stitch pattern directions, weave dimensions, thread dimensions, and the like. The second image can also be analyzed to determine 1014 one or more true colors from the image data, such as by analyzing a color reference in the image data, a series of images captured using different illumination, or another such process disclosed or suggested herein. The object feature data, thread pattern data, and/or true color data can then be compared 1016 against object data stored in an electronic repository, such as an object catalog. As part of the matching process, a set of objects can be identified 1018 with associated confidence scores or other such values. A determination can be made 1020 as to whether any of the objects are determined to match or correspond to the data with at least a minimum level, value, or threshold of confidence or certainty. If so, information for that object can be provided 1022 as identifying information for the object. If a determination cannot be made with at least a minimum level of confidence, etc., then information for a subset of the objects can be provided 1024 as a set of potential search results, where those search results can be ordered by confidence score in at least some embodiments.

Figure 11:
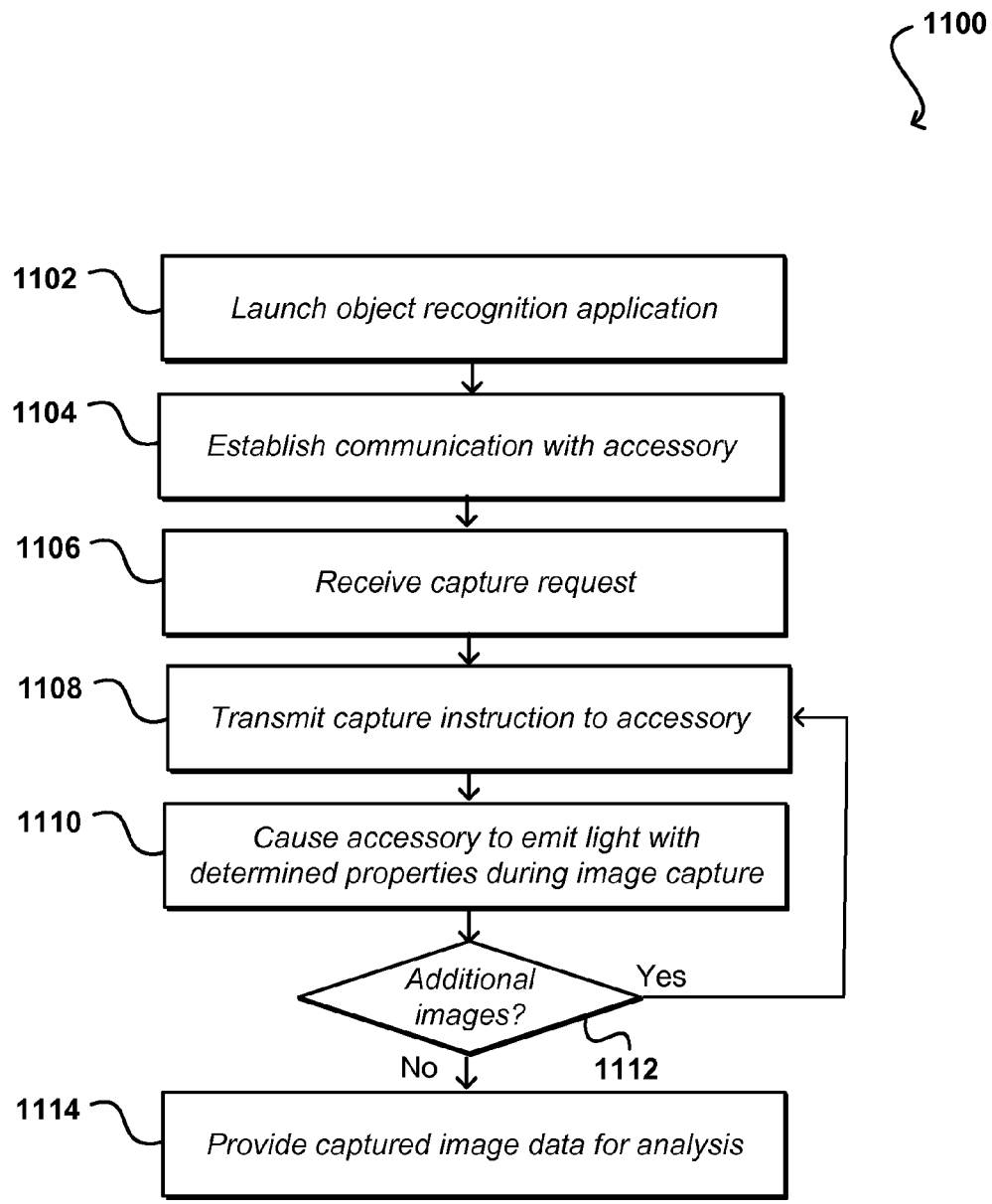
FIG. 11 illustrates an example process for using a color standard with object recognition that can be utilized in accordance with various embodiments.

FIG. 11 illustrates another example process 1100 that utilizes a device accessory to capture a series of images that can be utilized in accordance with various embodiments. In this example, an image capture application is launched 1102 on a computing device. As part of the launch process, or in response to another action or input, communication can be established 1104 with the accessory. This can include, for example, transmitting a wireless connection request or communicating with the accessory over a wired communication connection, among other such options. Further, in some embodiments the communication can be established at any appropriate time, such as when the accessory is physically connected to the device or when a wireless communication channel is manually or automatically established, among other such options. In some embodiments a communication channel may not need to be established, such as where a trigger can be sent using a code (i.e., a binary code) flashed by the flash of the computing device that can be detected by a sensor of the accessory. If the accessory is associated with a software application executing on the device that has access to one or more codes for triggering one or more types of illumination, for example, then the flashing of the appropriate code by the device can trigger the corresponding action by the accessory.

A capture request can be received 1106 to the computing device, as may be initiated by user input, the application, a sensor on the accessory, or another such source. In response, an image capture call can be transmitted 1108 to the accessory. In response, the accessory can be caused 1110 to emit light of having one or more specified properties, such as a known color temperature, determined intensity, wavelength, direction, etc., while at least one image is captured by the computing device. Multi-spectral imaging can allow for a precise determination of composition of cloth such as cotton, petroleum based materials, etc. Further, texture and weave might be best understood under infrared (IR) lighting as this will largely erase the effects of color, easing the task of separating fine patterns from actual texture. A determination can be made 1112 as to whether additional images are to be captured using light with different properties. If so, the process can continue and another image captured with at least different lighting property. If all images are captured, the captured image data can be provided 1114 for material analysis. As discussed, this can include use of algorithms such as computer vision, deep learning, pattern recognition, and the like, which can be performed on the computing device or by a remote system or service in at least some embodiments. Further as mentioned, the image data can include image data for a single image captured using light with a known color temperature, for example, or multiple images each captured using light with at least one different property. In one example process, the dominant thread orientation of a material is determined, with any noise due to non-linearities of the fabric then being removed based at least in part upon a linearization or other process with respect to the dominant direction. An algorithm can then walk along the dominant axis to extract salient features along that axis, which can help provide the characteristics of a particular thread row, with the process capable of being repeated for other rows, such as rows with other orientations. In some embodiments the overall material image data can be canonicalized and then analyzed using a deep learning approach in order to classify the material based upon aspects of the material, among other such options. If multiple pattern or material regions are present, those regions can be segmented and analyzed separately in at least some embodiments.

Figure 12:
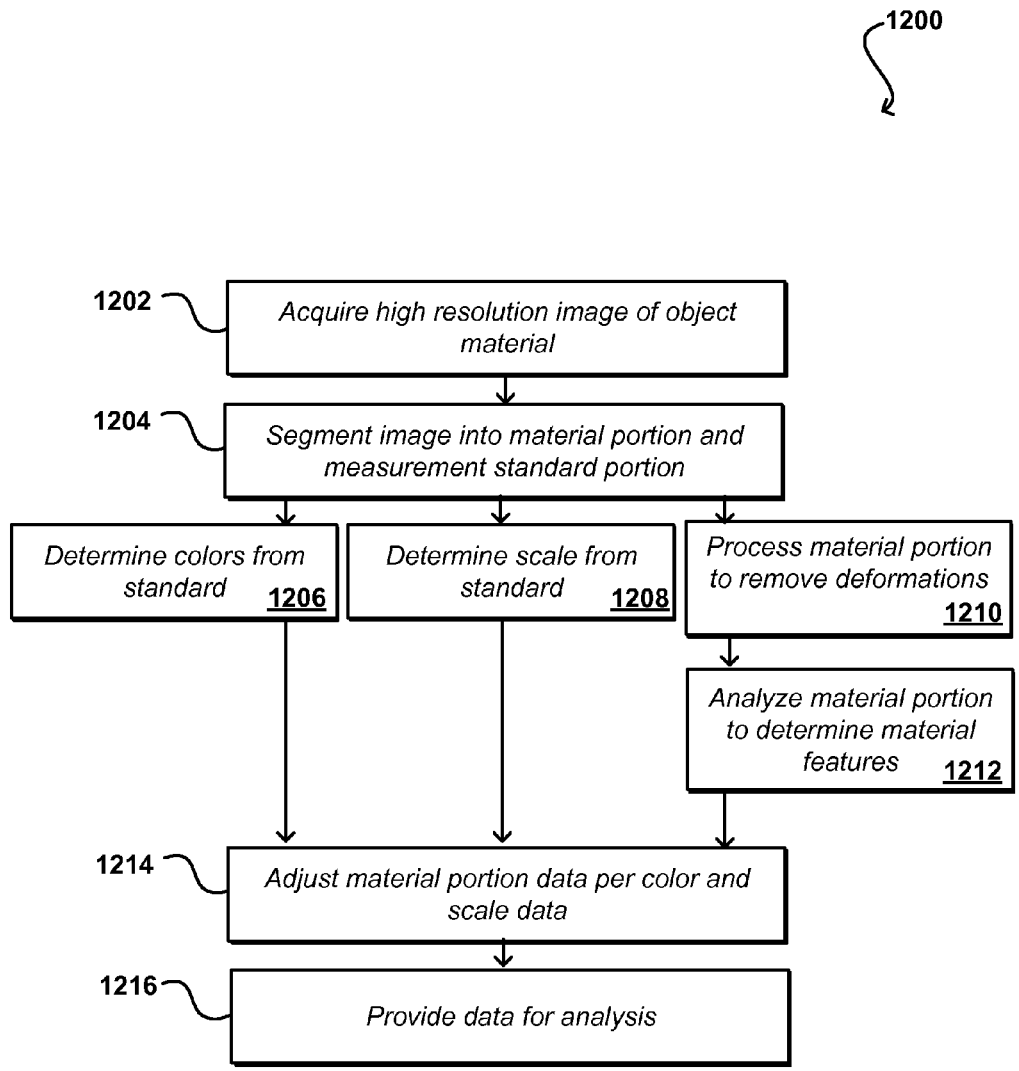
FIG. 12 illustrates an example process for performing object recognition that can be utilized in accordance with various embodiments.

FIG. 12 illustrates another example process 1200 for determining material information for an object that can be utilized in accordance with various embodiments. In this example, an image is acquired 1202 that includes a representation of a portion of an object at a relatively high resolution (i.e., at least 8 MP or at least 12 MP in some embodiments) and/or taken at a sufficient proximity to enable individual threads or other material portions of the object to be discernible in the image. The image also will include at least a portion of a measurement standard, which can include information for true color and/or scale, among other such possibilities. The image can be analyzed to segment 1204 the image into a measurement standard portion and a material portion. In at least some embodiments, the material portion will be represented within an interior or opening of the measurement standard as discussed elsewhere herein. Concurrently, sequentially, or in other appropriate orders, the detected colors for color regions of the measurement standard can be determined 1206, which can provide some insight into how the colors of the image may deviate from true color due to factors such as sensor accuracy and software image adjustments. The scale of the measurement standard as represented in the image can also be determined 1208, which can provide dimension data for portions of the corresponding material portion. The image for the material region can first be processed 1210 to remove any deformations represented in the image, as may be due to material being stretched, placed on a non-planar surface, etc. The image data for the material region can also be analyzed 1212 to determine features of the material that can be useful for classification, matching, or other recognition processes. These can include, for example, feature points, weave pattern, thread widths, thread alignment, thread texture or fuzziness, thread sheen or reflectivity, thread densities, dominant and secondary colors, and the like. The data for the material region then can be adjusted 1214, updated, enhanced, or supplemented using the scale and color data from the analysis of the measurement standard. This can include, for example, applying color adjustments to cause the colors of the material region to be identified as their true colors, as well as to update or provide dimension data for the recognized pattern properties. The material image data as adjusted using the measurement standard data then can be provided 1216 to a recognition process to attempt to identify a matching material or an object having similar material properties, among other such options.

The ability to analyze materials in such ways is not beneficial only for purposes such as object recognition and counterfeit detection, but can be useful for various other applications as well. For example, tailors can use such applications to help understand various material options in order to select or locate a material with specific properties. Such an approach can also be used to "automatically" verify whether a person or manufacturer is successful at waiving or producing the right pattern. Such an approach can also be useful for recognizing/searching/matching rugs and carpets, such that applications might be specifically configured for users interested in trading rugs and carpets. As mentioned, applications are not limited to apparel or even cloth, but can also be useful for anything with a microscopic or very small pattern, such as may include walls, furniture, blinds, art, fur items, and the like. The patterns or textures can correspond to various types or features, such as brushed versus polished metal, smooth versus rough texture, surface roughness, leather grain size, and the like.

Figure 13:
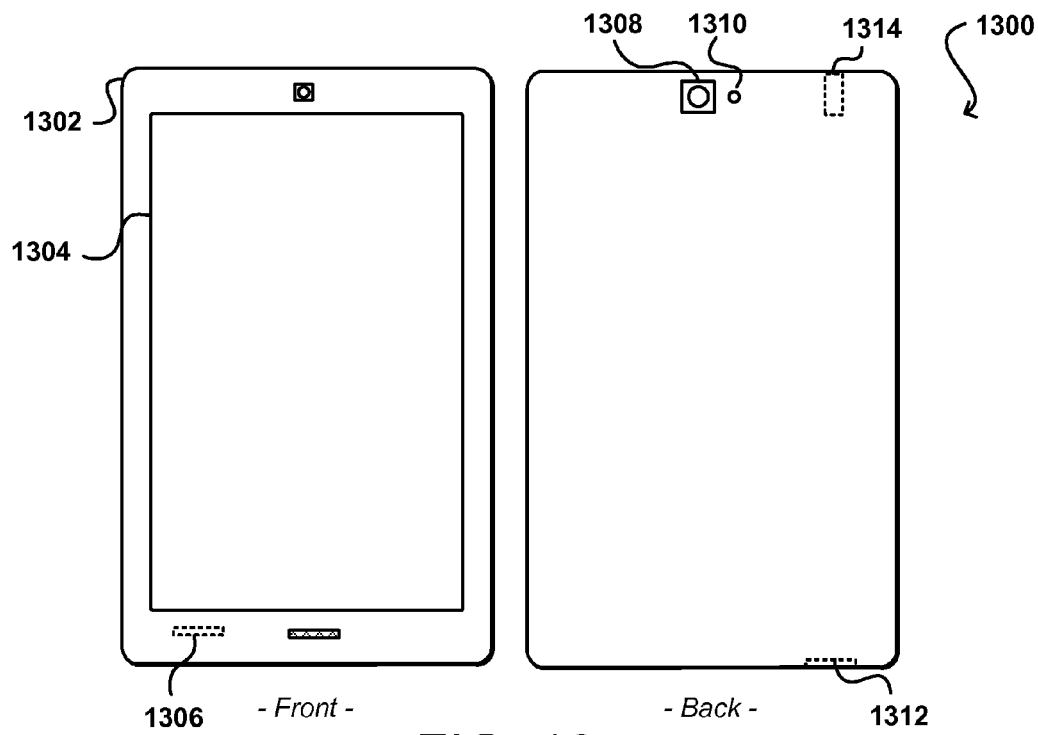
FIG. 13 illustrates front and back views of an example computing device that can be utilized in accordance with various embodiments.

FIG. 13 illustrates "front" and "back" views of an example computing device 1300 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. Further, terms such as front and back are used for simplicity of explanation and should not be interpreted as a limitation on the scope of the various embodiments unless otherwise specifically stated.

In this example, the front of the computing device 1300 has a display screen 1304 and an outer casing 1302. The display screen under normal operation will display information to a user (or viewer) facing the display screen (e.g., on the same side of the computing device as the display screen). As discussed herein, the device can include one or more communication components 1306, such as may include a cellular communications subsystem, Wi-Fi communications subsystem, BLUETOOTH® communication subsystem, and the like. The back of the device includes another camera 1308, typically of higher resolution than a front camera, as well as a flash 1310 or other illumination element. Although not shown, the device may also include a light sensor to assist in determining when to activate the flash element 1310. As mentioned, the device can also include ports such as a data/power communication port (i.e., a USB 3.0 port) 1312 and an audio port 1314 capable of receiving and/or transmitting data and/or power within the scope of the various embodiments.

Figure 14:
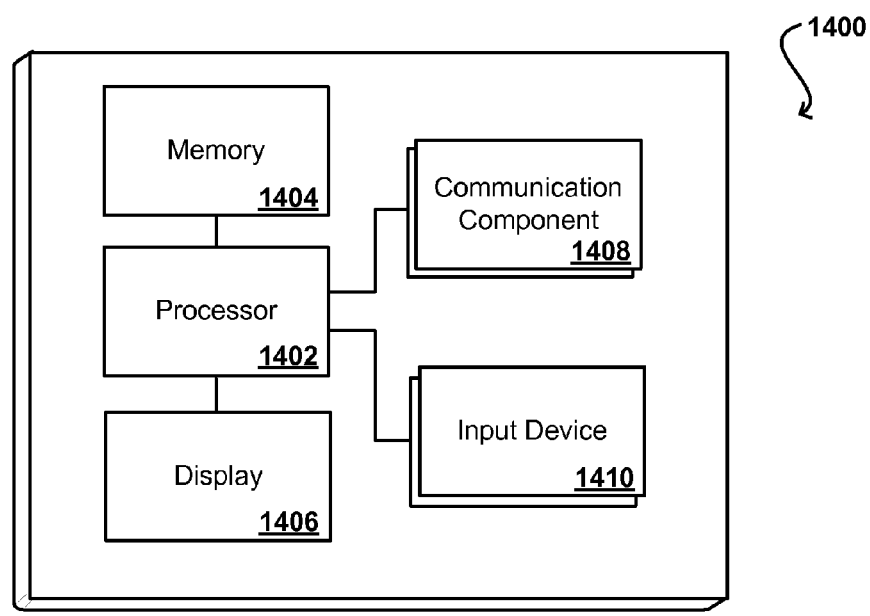
FIG. 14 illustrates an example configuration of components of a computing device, such as the device illustrated in FIG. 13.

FIG. 14 illustrates a set of basic components of a computing device 1400 such as the device 1300 described with respect to FIG. 13. In this example, the device includes at least one processor 1402 for executing instructions that can be stored in a memory device or element 1404. As would be apparent to one of ordinary skill in the art, the device can include many types of memory, data storage or computer-readable media, such as a first data storage for program instructions for execution by the at least one processor 1402, the same or separate storage can be used for images or data, a removable memory can be available for sharing information with other devices, and any number of communication approaches can be available for sharing with other devices. The device typically will include at least one type of display element 1406, such as a touch screen, electronic ink (e-ink), organic light emitting diode (OLED) or liquid crystal display (LCD), although devices such as portable media players might convey information via other means, such as through audio speakers. The device can include at least one communication component 1408, as may enabled wired and/or wireless communication of voice and/or data signals, for example, over a network such as the Internet, a cellular network, a Wi-Fi network, BLUETOOTH®, and the like. The device can include at least one additional input device 1410 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 15:
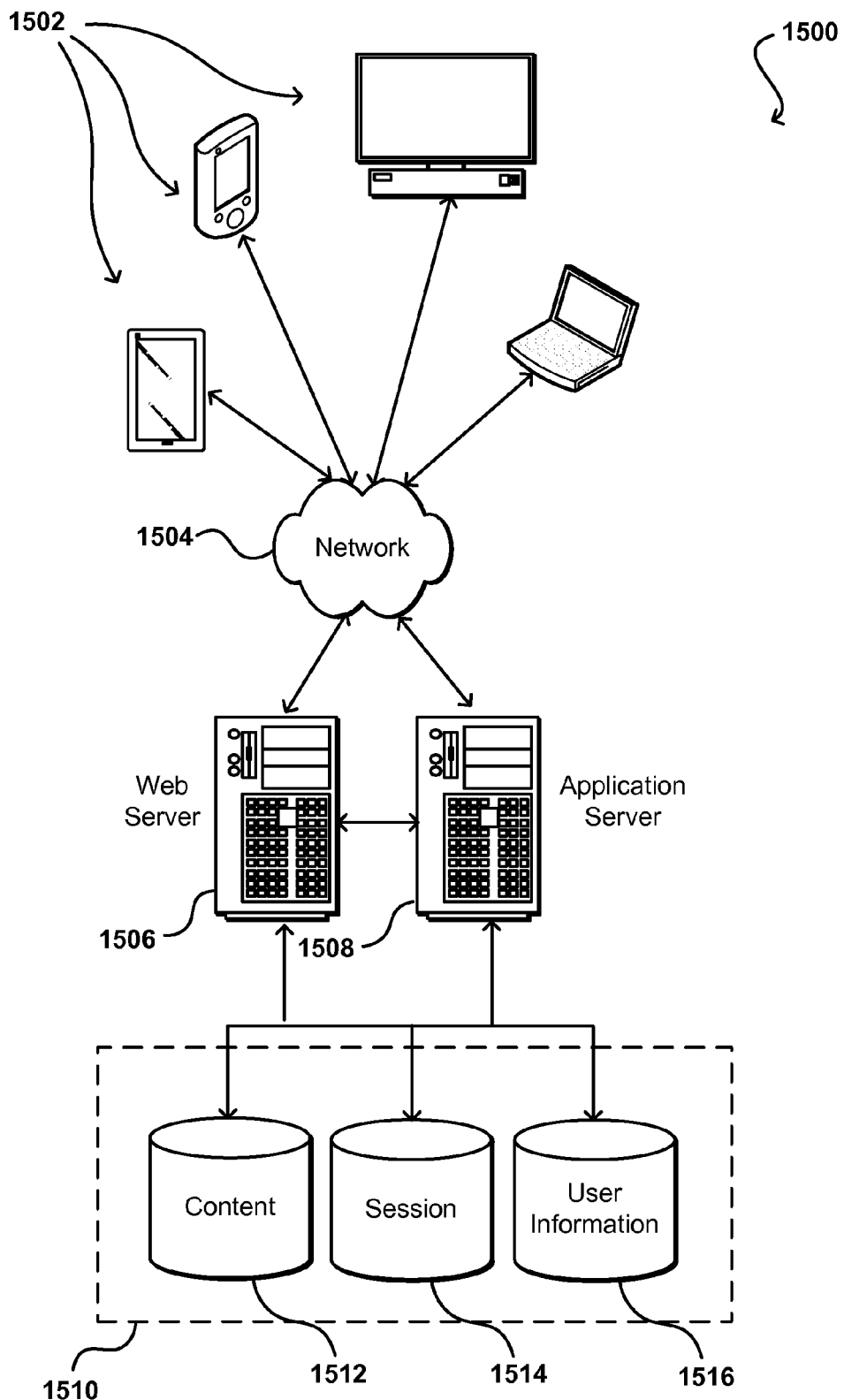
FIG. 15 illustrates an example environment in which aspects of the various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
capturing first image data including a first representation of an object, the object corresponding to an apparel item, the first representation providing a full view of the object from a first point of view;
receiving an instruction to capture second image data, the second image data including a second representation of a portion of the object enabling individual threads of the apparel item to be identified;
causing at least one instance of the second image data to be captured while light is emitted from at least one determined light source, each instance of the second image data captured with a respective set of illumination properties;
determining, from the second image data, weave pattern data for a material region of the apparel item;
determining, using the second image data, true color data, thread texture data, and dimension data for the threads of the material; and
providing the first image data, the weave pattern data, the true color data, the thread texture data, and the dimension data to an object recognition process, wherein the first image data is capable of being used to determine a type of the apparel item and the weave pattern data, true color data, and dimension data are capable of being used to discern between apparel items of the determined type.

2. The computer-implemented method of claim 1, further comprising:
establishing communications with an accessory having a determined size and a focal lens for enabling a camera to focus on the material region of the apparel item when the accessory is brought into contact with the apparel item, the accessory further shaped to prevent external light from being detected by the camera while positioned against the apparel item; and
causing one or more illumination sources to respectively emit light for each of at least a subset of instances of the second image data, each illumination source capable of emitting light with at least one of a determined wavelength, direction, or polarization.

3. The computer-implemented method of claim 1, further comprising:
determining a primary orientation of the threads of the material region of the apparel pattern; and
determining a set of features along the primary orientation as at least a portion of the weave pattern data.

4. The computer-implemented method of claim 1, further comprising:
analyzing the second image data to determine at least one type of thread, knot, fiber, or texton represented in the material region of the apparel item.

5. A computer-implemented method, comprising:
receiving a first image including a first representation of an item, the first representation of the item taken from at least a first determined distance enabling at least a majority of a first view of the item to be represented in the first image;
receiving a second image including a second representation of a portion of the item, the second representation taken from at most a second determined distance enabling a material texture of the item to be determined;
determining, using at least one processor of a computer system, a type of the item by analyzing the first image;
determining, using the at least one processor and data for the material texture from the second image, a matching item of the type of item that exhibits the material texture; and
providing information for the matching item as identifying information for the item represented in the first image.

6. The computer-implemented method of claim 5, further comprising:
determining, from the second image, a portion of the second image corresponding to a measurement standard, the measurement standard providing at least one of a true color reference or a distance reference.

7. The computer-implemented method of claim 6, further comprising:
analyzing the portion of the second image corresponding to the measurement standard to determine the represented color for each of a set of true color values; and
adjusting at least one color parameter of the second image based at least in part upon a difference between the represented colors in the second image and the true color values.

8. The computer-implemented method of claim 7, wherein the at least one color parameter includes at least one of a brightness, a gamma value, a white value, a contrast, or a color temperature.

9. The computer-implemented method of claim 6, further comprising:
analyzing the portion of the second image corresponding to the measurement standard to determine the represented length of the distance reference in the second image; and
adjusting at least one dimension of the second image based at least in part upon a difference between the represented length and the measurement standard.

10. The computer-implemented method of claim 5, further comprising:
determining a primary orientation of the material texture as represented in the second image; and
determining a set of features along the primary orientation as at least a portion of the material texture.

11. The computer-implemented method of claim 5, further comprising:
capturing at least a third image including a third representation of the portion of the item, the third image captured while using a different property of light than used to capture the second image; and
analyzing color data for the second image and the third image to determine true color data for the material texture.

12. The computer-implemented method of claim 11, wherein the different property includes at least one of a different light, orientation, polarization, wavelength, proximity, or color temperature.

13. The computer-implemented method of claim 5, further comprising:
receiving a plurality of material images, each material image associated with an item;
determining, for each of the material images, a true color histogram representing one or more true colors represented by at least one material region of the material image; and
storing data for each true color histogram with the respective material image, wherein an object identification process is enabled to utilize the true color histogram to match the corresponding item against data for a query image.

14. The computer-implemented method of claim 5, further comprising:
receiving tracking data indicating a change in at least one of a location, orientation, or state of a camera between capturing of the first image and the second image, the tracking data capable of being analyzed to determine relative scale information for the item represented in the first image and the material texture represented in the second image.

15. The computer-implemented method of claim 5, further comprising:
communicating with a device accessory for capturing the second image, wherein the device accessory is configured to emit light of a determined wavelength during the capturing of the second image while blocking out light from other sources.

16. A non-transitory computer readable storage medium storing instructions that, when executed by at least one processor of a computing device, cause the computing device to:
receive a first image including a first representation of an item, the first representation of the item taken from at least a first determined distance enabling at least a majority of a first view of the item to be represented in the first image;
receive a second image including a second representation of a portion of the item, the second representation taken from at most a second determined distance enabling a material texture of the item to be determined;
determine, using at least one processor of a computer system, a type of the item by analyzing the first image;
determine, using the at least one processor and data for the material texture from the second image, a matching item of the type of item that exhibits the material texture; and
provide information for the matching item as identifying information for the item represented in the first image.

17. The non-transitory computer readable storage medium of claim 16, wherein the instructions, when executed by the at least one processor, further cause the computing device to:
determine, from the second image, a portion of the second image corresponding to a measurement standard, the measurement standard providing at least one of a true color reference or a distance reference.

18. The non-transitory computer readable storage medium of claim 17, wherein the instructions, when executed by the at least one processor, further cause the computing device to:
analyze the portion of the second image corresponding to the measurement standard to determine the represented color for each of a set of true color values; and
adjust at least one color parameter of the second image based at least in part upon a difference between the represented colors in the second image and the true color values.

19. The non-transitory computer readable storage medium of claim 17, wherein the instructions, when executed by the at least one processor, further cause the computing device to:
analyze the portion of the second image corresponding to the measurement standard to determine the represented length of the distance reference in the second image; and
adjust at least one dimension of the second image based at least in part upon a difference between the represented length and the measurement standard.

20. The non-transitory computer readable storage medium of claim 16, wherein the instructions, when executed by the at least one processor, further cause the computing device to:
capture at least a third image including a third representation of the portion of the item, the third image captured while using a different property of light than used to capture the second image; and
analyze color data for the second image and the third image to determine true color data for the material texture.

* * * * *